United States Patent [19]

Shipley

[11] Patent Number: 5,196,776
[45] Date of Patent: Mar. 23, 1993

[54] WAVEFORM GENERATOR FOR A RESOLVER

[75] Inventor: Marcus M. Shipley, Palo Alto, Calif.

[73] Assignee: Space Systems/Loral, Inc., Palo Alto, Calif.

[21] Appl. No.: 683,084

[22] Filed: Apr. 9, 1991

Related U.S. Application Data

[63] Continuation of Ser. No. 404,167, Sep. 6, 1989, abandoned.

[51] Int. Cl.$^5$ .......................................... H03K 13/00
[52] U.S. Cl. .................................. 318/660; 318/661; 318/657; 318/656; 328/155; 340/870.21; 340/870.34
[58] Field of Search ............... 318/654, 655, 656, 657, 318/658, 659, 660, 661, 683; 307/260–264, 529, 515, 350, 351; 340/658, 870.21, 870.34; 328/142, 155

[56] References Cited

U.S. PATENT DOCUMENTS

| | | | |
|---|---|---|---|
| 3,027,516 | 3/1962 | Brouwer | 318/656 X |
| 3,083,323 | 3/1963 | Vigour | 318/594 |
| 3,475,626 | 10/1969 | Holzman et al. | 307/529 |
| 3,577,088 | 5/1971 | Goggins, Jr. | 328/155 X |
| 3,634,838 | 1/1972 | Granqvist | 340/196 |
| 3,701,936 | 10/1972 | Martin et al. | 318/661 X |
| 3,710,223 | 1/1973 | Cottrell | 318/661 |
| 3,812,433 | 5/1974 | Bradley | 328/155 |
| 3,914,760 | 10/1975 | Logue | 340/347 |
| 3,990,062 | 11/1976 | Miller et al. | 340/198 |
| 4,070,665 | 1/1978 | Glennon et al. | 318/661 X |
| 4,093,903 | 6/1978 | Thomas | 318/654 X |
| 4,109,189 | 8/1978 | Jacques et al. | 318/608 |
| 4,134,106 | 1/1979 | Hungerford | 340/347 |
| 4,272,818 | 6/1981 | McDaniel | 318/603 X |
| 4,319,172 | 3/1982 | Sieradzki | 318/656 X |
| 4,390,865 | 6/1983 | Lauro | 318/661 X |
| 4,429,267 | 1/1984 | Veale | 318/594 |
| 4,449,117 | 5/1984 | Fortescue | 318/661 X |
| 4,467,320 | 8/1984 | McPhee | 318/657 X |
| 4,514,689 | 4/1985 | Gerard | 318/657 X |
| 4,527,120 | 7/1985 | Kurosawa | 324/166 |
| 4,607,229 | 8/1986 | Isobe et al. | 307/262 X |
| 4,644,184 | 2/1987 | Miyawaki et al. | 307/262 X |
| 4,695,804 | 9/1987 | Bardl et al. | 307/529 X |
| 4,737,724 | 4/1988 | Porrot | 328/155 |
| 4,795,954 | 1/1989 | Sakurai et al. | 318/661 |
| 4,808,936 | 2/1989 | Lamb | 328/155 |
| 4,843,291 | 6/1989 | Predina | 318/605 |
| 4,868,428 | 9/1989 | Cooper | 307/529 |
| 4,906,909 | 3/1990 | Gremillion et al. | 318/605 X |
| 4,922,175 | 5/1990 | Sugiura et al. | 318/594 X |

OTHER PUBLICATIONS

*Physics* (Tipler Physics) by Paul A. Tipler Worth Publishers Inc, Jan. 1976 pp. 549–551.

Data Sheet on REF-15001 Series, "Synchro/Resolver-/Inductosyn Reference Oscillator", ILC Data Device Corporation, p. E-80 (Undated).

(List continued on next page.)

Primary Examiner—Paul Ip
Attorney, Agent, or Firm—C. Michael Zimmerman; Edward J. Radlo

[57] ABSTRACT

A waveform generator for a resolver transducer or the like is described. Such generator forms two 3-level waveforms which approximate sinusoidal waveforms for the excitation and/or output detection of such a resolver. Each of the sinusoidal waveforms is formed by combining a pair of digitally programmed bi-state signals which have their phases shifted relative to one another by an amount proportional to an angular input variable. The result is that the amplitude of these sinusoidal waveforms which are formed are representative of the sine and cosine of such variable.

3 Claims, 5 Drawing Sheets

OTHER PUBLICATIONS

Data Sheet on Analog Devices, "Inductosyn Preamplifier and Power Oscillator", pp. 13-17 to 13-19, Published in "Synchro & Resolver Converters", vol. II (Undated).

Data Sheet on Analog Devices, "High Power Output, Hybrid Digital-to-Resolver Converters", pp. 13-5 to 13-9, Published in "Synchro & Resolver Converters", vol. I (Undated).

Data Sheet on Synchro and Resolver to Digital Converters, "Background Information", pp. E-3 to E-5, Published by ILC Data Device Corporation (Undated).

*Synchro Conversion Handbook*, Fourth Printing, pp. 40-46, Published by ILC Data Device Corporation (Undated).

*Optics*, by Francis Weston Sears, pp. 194-195, Addison-Wesley Publishing Company, Inc. (Undated).

*Fundamentals of Optics*, by Francis A. Jenkins and Harvey E. White, pp. 575-577, Published by McGraw-Hill Book Company, Inc., 1957.

*Theory of Alternating-Current Machinery*, by Alexander S. Langsdorf, pp. 201-203, Published by McGraw-Hill Book Company, Inc., 1955.

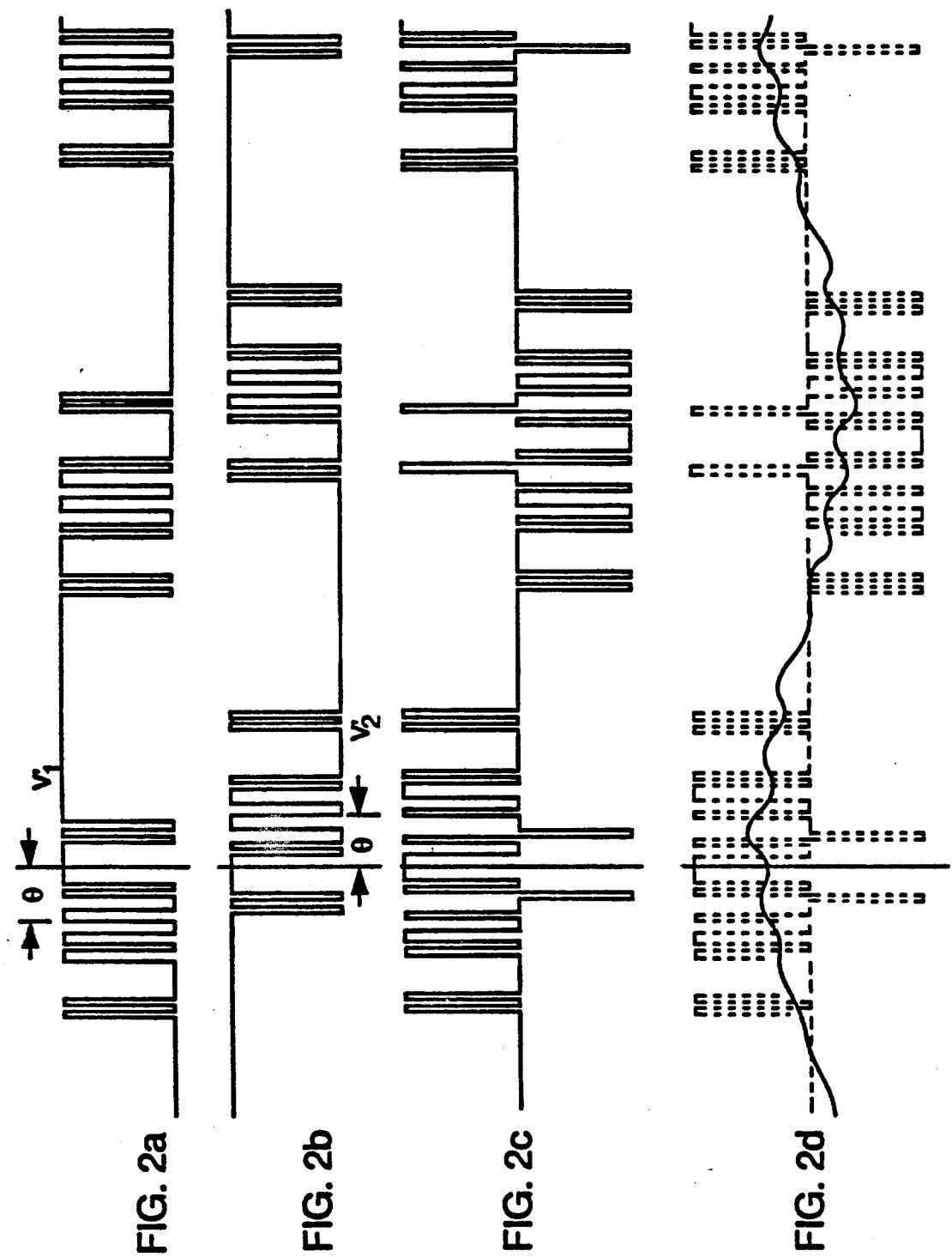

WAVEFORM GENERATOR FOR A RESOLVER

This is a continuation of application Ser. No. 07/404,167 filed Sep. 6, 1989 now abandoned.

BACKGROUND OF THE INVENTION

The present invention relates to the generation of one or more sinusoidal waveforms representative of variables and, more particularly, to the generation of one or more 3-level waveforms which approximate sinusoidal waveforms representative of a variable. It more specifically relates to the generation of two 3-level waveforms approximating the sine and cosine values of an angular variable.

Many resolver transducers and the like now available for sensing the value of an angular variable are excited by analog signals formed by linear circuitry. In some instances it has been necessary to include a "digital-to-resolver converter" to provide the desired analog signals. These converters have circuitry similar to digital-to-analog converters, except that trigonometric sine and cosine relationships must be somehow calculated, such as with a look-up table or a specially constructed analog network. Some resolver transducers also are designed to rely on the combination with the outputs of the resolver stators, of analog signals representative of the sine and cosine of an angular input variable to enable the angular position of the resolver rotor to be determined. In other words, the provision of analog signals by linear (active) circuitry has been a significant requirement of resolver transducers. It is desirable, however, to minimize the use of linear circuitry in satellite, space station or robotic structures that must perform long-lived missions in a hostile space environment. Analog components are subject to drift problems and their stability is quite sensitive to the radiation exposure that is found in space.

SUMMARY OF THE INVENTION

The present invention minimizes the use of linear circuitry in either exciting a resolver transducer or sensing the output of a resolver transducer. From the broad standpoint it is based on the discovery that the sine or cosine of a variable considered to be angular is proportional to the amplitude of a sinusoidal waveform represented by an electrical signal formed from the combination of two other electrical signals representative of sinusoids. This output signal is formed by shifting the phases of the two signals which make the same up, proportional to the variable. Most desirably, two separate signals are formed which represent two different values, such as the sine and the cosine, of the variable. These signals then can be used either to excite the stators of a resolver transducer or be combined with their output to determine the resolver angular position.

It has been found that linear circuitry can be eliminated by making the electrical signals which are combined to form the output signal, bi-state digital signals. The result is that the output signal is a 3-level electrical signal. The use of such a digitally constructed waveform for exciting or sensing the output of a resolver eliminates the need for linear circuitry and results in a resolver arrangement which is highly stable over time, and throughout radiation exposure, can be digitally implemented for predictable and repeatable design, requires lower power usage, facilitates computer interface, and if desired can be implemented via solid-state integration. It also permits implementations entirely in software where, for example, a resolver is remotely located in a robot arm joint and it is desired to do digital processing centrally.

The invention includes other features and advantages which will become apparent or will be described below in connection with a description of preferred implementations of the same.

BRIEF DESCRIPTION OF THE DRAWINGS

With reference to the accompanying drawings:

FIG. 2a-2d are waveform diagrams illustrating two digitally programmed signal outputs, the resultant 3-level signal formed from summing the same, and the sinusoidal waveform it represents;

DETAILED DESCRIPTION OF THE PREFERRED EMBODIMENTS

Figure 1A:
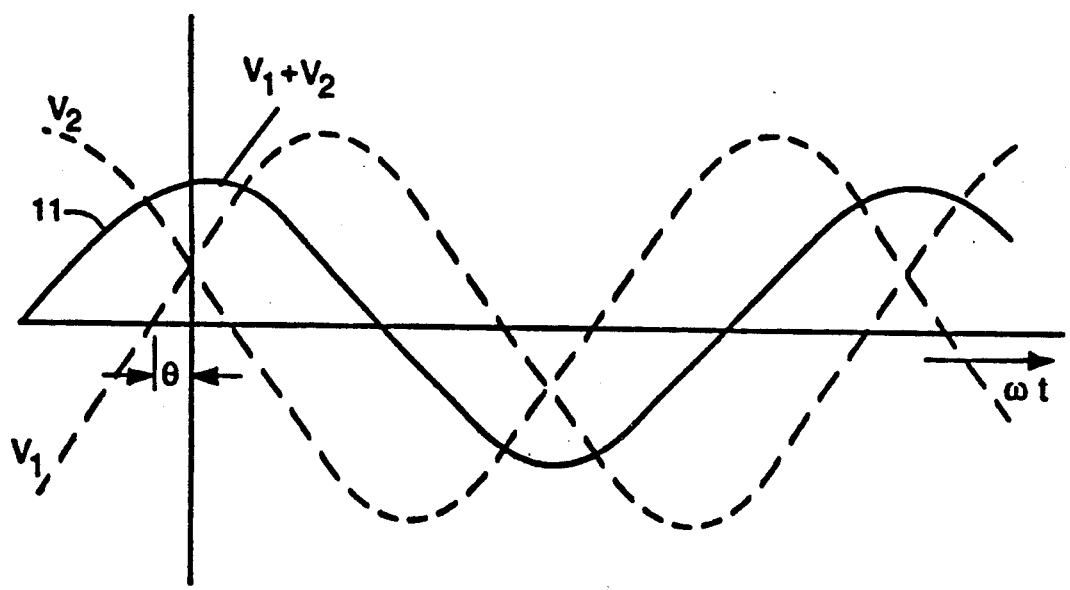
FIGS. 1a and 1b are illustrations of two sinusoidal waveforms that are generated to have amplitudes proportional, respectively, to the sine and cosine of an angular variable.
Figure 1B:
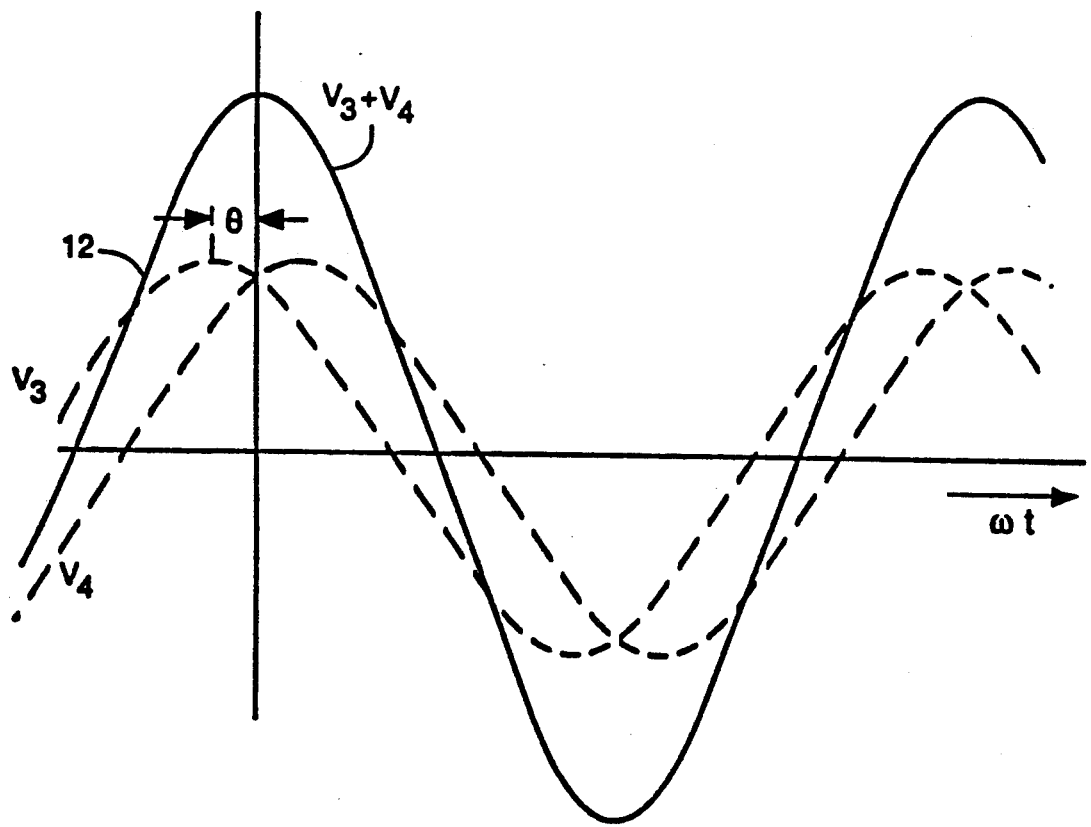

FIGS. 1a and 1b illustrate the formation of sinusoidal waveforms having amplitudes proportional respectively to the sine and cosine of a variable. With reference to FIG. 1a, a pair of sinusoid signals is represented by the dotted lines $V_1$ and $V_2$. Each of these voltages has the same, fixed frequency. It has been found that if the phase relationship of such two sinusoids is made the same as, or proportional to, a variable as represented in the drawing by $\theta$, the maximum amplitude of the sinusoidal waveform formed by summing (adding or subtracting) the two sinusoids varies as the sine of $\theta$. (The term "amplitude" as used herein and in the claims means the maximum amplitude unless the context of the same indicates differently.) This combination is represented in FIG. 1a by the sinusoidal waveform 11.

Most simply, the two voltages $V_1$ and $V_2$ have the same amplitude. It is then unnecessary to take into account any amplitude difference between the two in calculating the value of the variable. From the broad standpoint, though, it will be recognized that it is only necessary that the relationship of the amplitudes of the two signals be known.

As $\theta$ is varied from zero to 360 degrees, the value of the maximum amplitude of waveform 11 will vary as the sine of $\theta$. In mathematical terms, $V_1 + V_2 = 2A \cos \omega t \sin \theta$. Thus, if A and $\omega$ (the frequency) are maintained constant, the amplitude is proportional to $\sin \theta$.

It will be appreciated that although the sinusoids which are summed in the above are representative of signal voltages, sinusoids representative of signal currents will be the same.

FIG. 1b illustrates the formation of a sinusoidal waveform having an amplitude proportional to the cosine of an angular input variable. It is formed essentially the same way as the sinusoidal waveform of FIG. 1a, except its constituent sinusoids, $V_3$ and $V_4$, represent cosine values. That is, the sinusoids defined by $V_3$ and $V_4$ are one-quarter cycle different than the sinusoids defined by $V_1$ and $V_2$. As illustrated, their phase is also shifted in each direction by an angular amount representing an input variable $\theta$. The resultant sinusoidal waveform 12 when such voltages are combined, though, has an amplitude which varies with the cosine of the angular input variable. That is, $V_3 + V_4 = 2A \cos \omega t \cos \theta$.

It is necessary in most potential uses of the method of the instant invention that both sinusoidal waveforms be formed —— one representing the sine of an angular variable and the other representing the cosine.

The present invention is particularly valuable because it is conducive to implementation in bi-state and 3-level arrangements, thereby eliminating or minimizing the need for linear circuitry to form sinusoidal waveforms —— they can be synthesized by approximation. Reference is made to FIG. 2 which shows a preferred implementation of this. FIG. 2a illustrates a bi-state (digital) representation $V_1'$ of the sinusoid $V_1$ illustrated in FIG. 1a. As illustrated, its phase is shifted in the negative direction from a reference ordinate line by an amount represented at $\theta$. It is a digitally programmed pulse width modulated signal. That is, it is formed by dividing the period of the sinusoid into a number of equal time segments and assigning to each segment one of two voltage states. In one implementation of the invention, the sinusoid period is divided into 128 segments and the levels assigned for each segment to maximize the fundamental frequency component and minimize the lower harmonic components. I this implementation, the lower voltage state was zero volts and the upper state was $+5$ volts.

Use of a digitally programmed signal to approximate the sinusoid and, hence, the desired sinusoidal waveform enables undesired harmonics to be eliminated or suppressed. That is, if a particular bi-state representation in the selected segment indicates an amplitude is known to be caused by an undesired harmonic, it simply can be eliminated. This elimination correspondingly eliminates the harmonic value from being used in approximating the desired sinusoidal waveform. For example, in the implementation discussed above in which each cycle of a sinusoid was divided into 128 segments (32 to a quarter), it was determined empirically that segment Nos. 3, 4, 6, 13 and 15 of the first quarter, should be set to the lower voltage state. Values were assigned to the remaining quarters following the symmetry (or anti-symmetry) of the sinusoid.

FIG. 2b illustrates a bi-state representation of the sinusoid $V_2$ of FIG. 1a. It also is a phase shifted signal. However, its phase is shifted in the positive direction from the reference line by an amount $\theta$. Such signal also is a digitally programmed approximation to enable undesired harmonics to be eliminated.

FIG. 2c shows the results of summing signals $V_1'$ and $V_2'$ to form the desired approximation synthesizing a sinusoidal waveform having an amplitude proportional to the sine of $\theta$. FIG. 2d illustrates the signal which is approximated after minimal filtering. This approximated signal represents the sine value of the input variable. Although it is not shown, it will be recognized by those skilled in the art that a digital signal synthesizing the cosine value of $\theta$ is formed essentially the same way.

Figure 3:
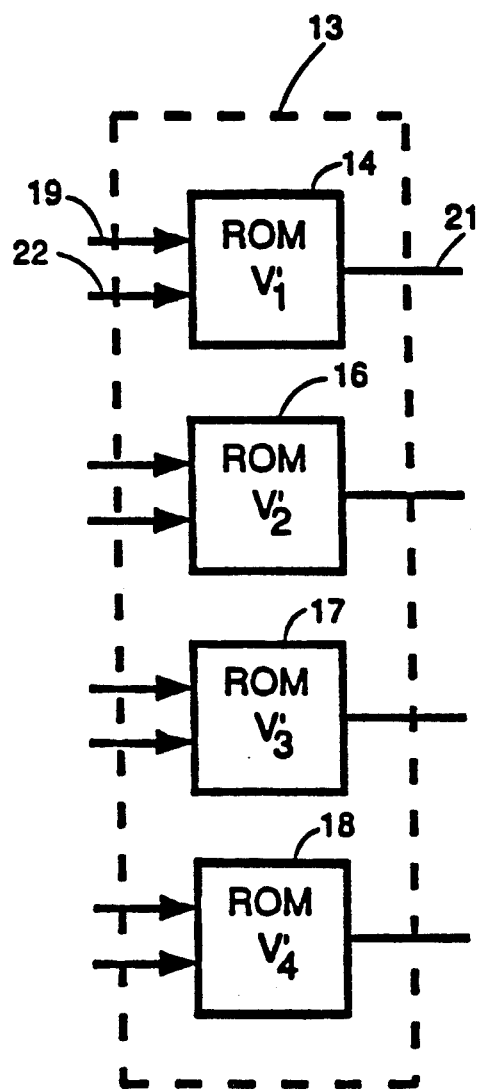
FIG. 3 is a block diagram illustration of means for forming bi-state electrical signals from which 3-level electrical signals representative of sinusoidal waveforms can be generated.

The digitally programmed signals of the invention are easily formed. That is, they can be formed by properly addressing a memory which stores the segment values. FIG. 3 is included simply to illustrate means for forming the signals. A digital memory is illustrated generally represented at 13. It is made up of four read-only memories (ROMs) respectively programmed with the values of the input segments representing the four waveforms $V_1'-V_4'$. Each is addressed as represented by input 19 of ROM 14 to place the bi-state segment values discussed above sequentially at its output 21. The phase shift representative of an input variable determines the phase timing of such address. Input of the same is represented at 22. Operation of the other ROMs is identical, except for the difference in phases that is required.

It will be appreciated that although four separate ROMs are illustrated for simplicity in understanding, memory space most desirably is preserved by multiplexing the inputs and outputs to generate the respective sinusoids from the same stored data.

Figure 4:
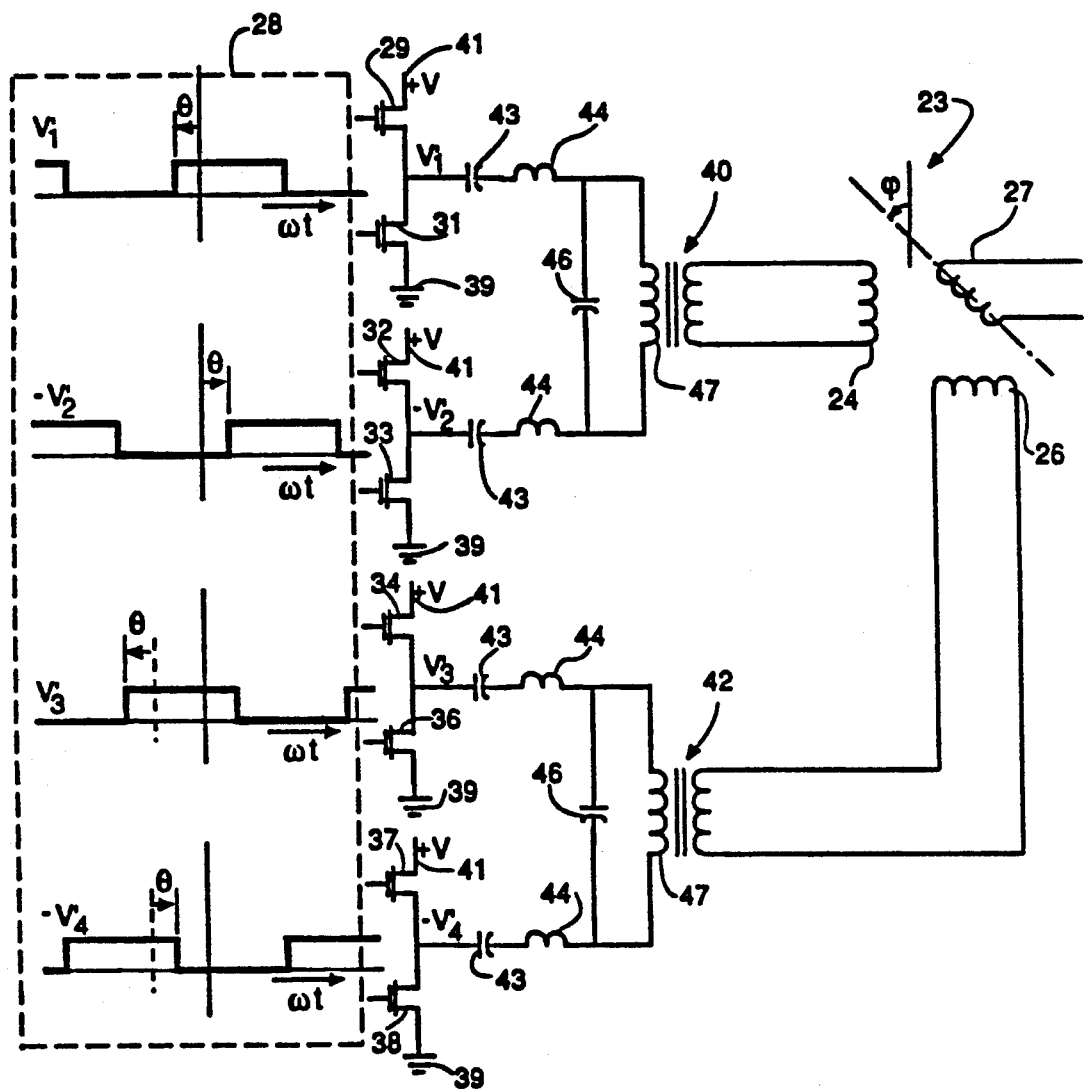
FIG. 4 is a schematic electrical diagram of circuitry for exciting the stator windings of a resolver in accordance with the instant invention.

FIG. 4 illustrates use for the invention of stator excitation of a resolver transducer, generally referred to by the reference numeral 23. Such transducer includes a pair of stator windings which are represented at 24 and 26 that are electrically 90° apart. It also includes a rotor 27. In a specific implementation, transducer 23 was the one sold with the trademark Inductosyn, by Farrand Controls, a division of Farrand Industries, Inc., Valhalla, N. Y. This transducer is a disc planar type having etched conductor traces. It is the mechanical positioning of such rotor traces relative to the stator traces, represented by the angle $\phi$ in the drawing, which is to be sensed.

Voltages $V_1'-V_4'$ formed in accordance with the instant invention are generally represented at 28. (It should be noted that the details of the signals are not illustrated and $V_2'$ and $V_4'$ are shown with polarity that is opposite that of $V_2'$ and $V_4'$ in FIG. 2.) Such signals are used to actuate power switches 29-38. As illustrated, each pair of such switches are connected between a ground state represented at 39 and a positive voltage 41. The switches of each pair are alternately activated with the switches of the corresponding pair electrically connected through a coupling transformer (transformers 40 and 42) to provide current flow in opposite directions through the same for sinusoidal waveform synthesis. The outputs from each pair after passing through a blocking capacitor 43 are passed through an LC filter to reduce those higher harmonic components of the waveform which were not eliminated during digital programming. Such LC network is represented by inductances 44 and capacitances 46 in parallel with the primary of the respective transformers.

With the circuitry described above, the primary 47 of each of the transformers 40 and 42 will sum the voltages which make up the desired sinusoidal waveform. The output of coupling transformer 40 directed to stator 24 will be, in essence, a waveform defined by $E_s \cos \omega t \sin \theta$, whereas the output of coupling transformer 42 directed to stator 26 will be $E_s \cos \omega t \cos \theta$, where $E_s$ is the same constant. These will induce a voltage in the rotor with an amplitude proportional to $\sin(\theta - \phi)$. Thus, the value of $\theta$ can be programmed and a motor driven servo used to position the rotor angle $\phi$ to the null. Alternatively, $\phi$ can be determined by finding the $\theta$ values for which $\sin(\theta - \phi)$ is close to zero, using interpolation if desired.

It will be appreciated from the above that since the desired sinusoidal waveforms are synthesized with simple digital signals the invention brings to resolver excitation the predictability and stability typically associated with digital approaches. This excitation circuitry can be used with transformer coupling as shown with a low impedance resolver transducer, or used directly coupled to the stator windings of a conventional resolver.

Figure 5:
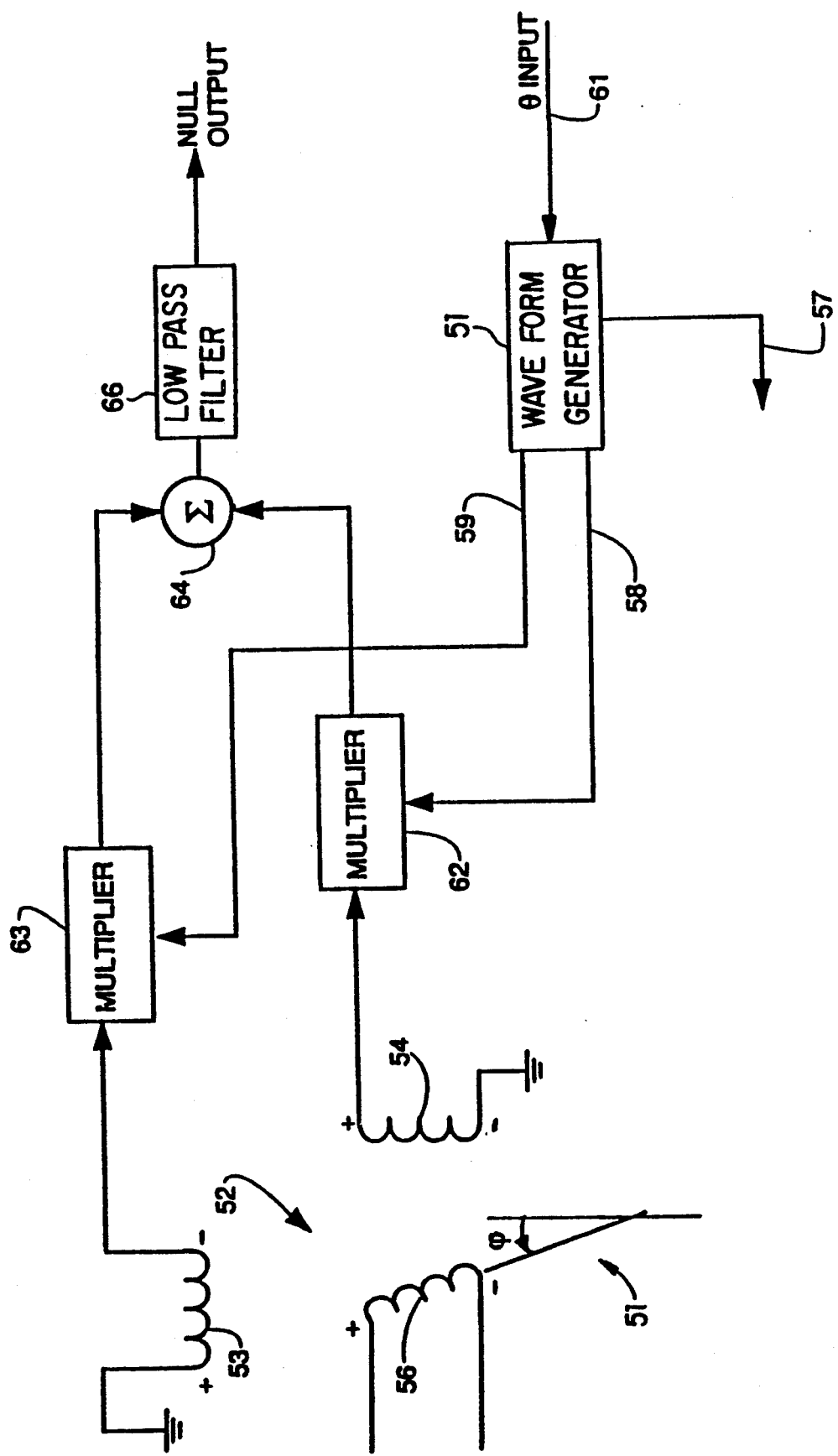
FIG. 5 is a schematic electrical diagram showing use of a waveform generator of the instant invention as a trigonometric function generator for a tracking (feedback) resolver-to-digital converter.

As mentioned previously, the invention is also usable as a trigonometric function generator for a tracking resolver-to-digital converter. FIG. 5 illustrates such a use. With reference to the same, a waveform generator of the invention is generally indicated at 51 and a resolver is represented at 52 by a pair of stators 53 and 54 and a rotor 56. Again, the object is to determine the mechanical orientation of the rotor relative to the stators, which orientation is represented in FIG. 5 by the angle $\phi$. The rotor is excited with a sinusoidal waveform, such as $A \cos \omega t$. Most desirably, such excitation signal is a digitally programmed one formed, for example, by the waveform generator 51. Output line 57 indicates such a reference output. It should be noted that the reference output on line 57 is not phase shifted and does not include information indicating the value of an input variable. The waveform generator 51, though, has two other outputs, indicated by lines 58 and 59, that represent the sine and cosine, respectively, of an angular input variable $\theta$. In this connection, the input of such variable is represented by line 61. Waveform generator 51 forms digitally programmed signals in accordance with the invention which approximate sine and cosine values of $\theta$. The sine value is multiplied as indicated by multiplier 62 with the output of stator 54, whereas the cosine value is multiplied as indicated by multiplier 63 with the output of stator 53. In mathematical terms, the output on line 58 is $A' \cos \omega t \sin \theta$. This is multiplied with the output of stator 54 which is equal to $A \cos \omega t \cos \phi$. The result of the multiplication has a major component equal to $A_0 \sin \theta \cos \phi$ where the constant $A_0$ includes the product of A and A'

The output of the waveform generator on line 59 is $A' \cos \omega t \cos \theta$. It is multiplied by the output of stator 53 which is $A \cos \omega t \sin \phi$, resulting in a product having as its dominant factor $A_0 \cos \theta \sin \phi$. This product is summed as indicated by summing node 64 with the product of the multiplication provided by multiplier 62. The summed signal is passed through a low pass filter represented at 66 to remove harmonics. Such sum will be equal to $A_0 \sin (\theta - \phi)$. The desired value of $\phi$ can be determined by conventional circuitry implementing the presently popular tracking converter method by generating a feedback value of $\theta$ to null the value of $A_0 \sin (\theta - \phi)$.

Although the invention has been described in connection with preferred embodiments thereof, it will be appreciated by those skilled in the art that various changes and modifications can be made without departing from its spirit. It is therefore intended that the coverage afforded applicant only be limited by the claims and their equivalents.

I claim:
1. A waveform generator for a resolver comprising:
   means for forming a first bi-state electrical input signal approximating a first sinusoidal waveform having a first phase;
   means for forming a second bi-state electrical input signal approximating a second sinusoidal waveform having generally the same frequency as said first sinusoidal waveform and a second phase having a first phase relationship with said first phase that is proportional to a first value of an input variable;
   means for summing said first and second bi-state electrical signals while said first phase relationship therebetween is maintained, thereby to generate a first 3-level electrical output signal representative of a third sinusoidal waveform having a maximum amplitude proportional to a sine of said variable;
   means for forming a third bi-state electrical input signal approximating a fourth sinusoidal waveform having a third phase;
   means for forming a fourth bi-state electrical input signal approximating a fifth sinusoidal waveform having generally the same frequency as said fourth sinusoidal waveform and a fourth phase having a second phase relationship with said third phase proportional to a second value of said variable; and
   means for summing said third and fourth bi-state electrical signals while said second phase relationship therebetween is maintained, thereby to generate a second 3-level electrical output signal representative of a sixth sinusoidal waveform having a maximum amplitude proportional to a cosine of said variable.
2. The waveform generator of claim 1 further including means for separately exciting individual ones of a pair of stators of a resolver with respective ones of said first and second 3-level electrical signals.
3. The waveform generator of claim 1 further including means for respectively combining each of said 3-level electrical signals with a respective one of the outputs of a pair of stators of a resolver to enable the first value of said input variable to be calculated.

* * * * *